(12) United States Patent
Spitalnik

(10) Patent No.: US 6,241,525 B1
(45) Date of Patent: Jun. 5, 2001

(54) PRESSURE ULCER WOUND CARE MODELS, METHODS AND KITS

(75) Inventor: Paul L. Spitalnik, Randolph, NJ (US)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 09/406,780

(22) Filed: Sep. 28, 1999

(51) Int. Cl.⁷ .................................................. G09B 23/28
(52) U.S. Cl. ........................................... 434/267; 434/262
(58) Field of Search ............................... 434/262, 267, 434/272

(56) References Cited

U.S. PATENT DOCUMENTS

| | | |
|---|---|---|
| 3,852,893 | 12/1974 | Smrcka . |
| 3,858,351 | 1/1975 | Porter . |
| 4,195,420 | 4/1980 | Fields . |
| 4,439,162 | 3/1984 | Blaine . |
| 4,494,936 | 1/1985 | Stickles . |
| 4,596,528 | 6/1986 | Lewis et al. . |
| 4,734,039 | 3/1988 | Thompson . |
| 4,773,865 | 9/1988 | Baldwin . |
| 5,314,339 | 5/1994 | Aponte . |

Primary Examiner—Sam Rimell
(74) Attorney, Agent, or Firm—Nixon & Vanderhye P.C.

(57) ABSTRACT

Three dimensional external human anatomy models integrally include pressure ulcer wound facsimiles representative of different pressure ulcer stages. More specifically, the wound model of the present invention is comprised of a three-dimensional sculpted base member resembling an external region of a human body which is provided integrally at discrete locations thereof with multiple pressure ulcer wound facsimiles, each of which respectively visually simulates a different type of Stage I–IV pressure ulcers. The base member may, however be provided with other (non-staged) pressure ulcer facsimiles, such as, for example, a pressure ulcer which is visually representative of granulation tissue, a trochanteric pressure ulcer covered with black eschar, or a yellowish coagulum as well as combinations of such pressure ulcer facsimiles.

32 Claims, 2 Drawing Sheets

PRESSURE ULCER WOUND CARE MODELS, METHODS AND KITS

FIELD OF THE INVENTION

Figure 1:
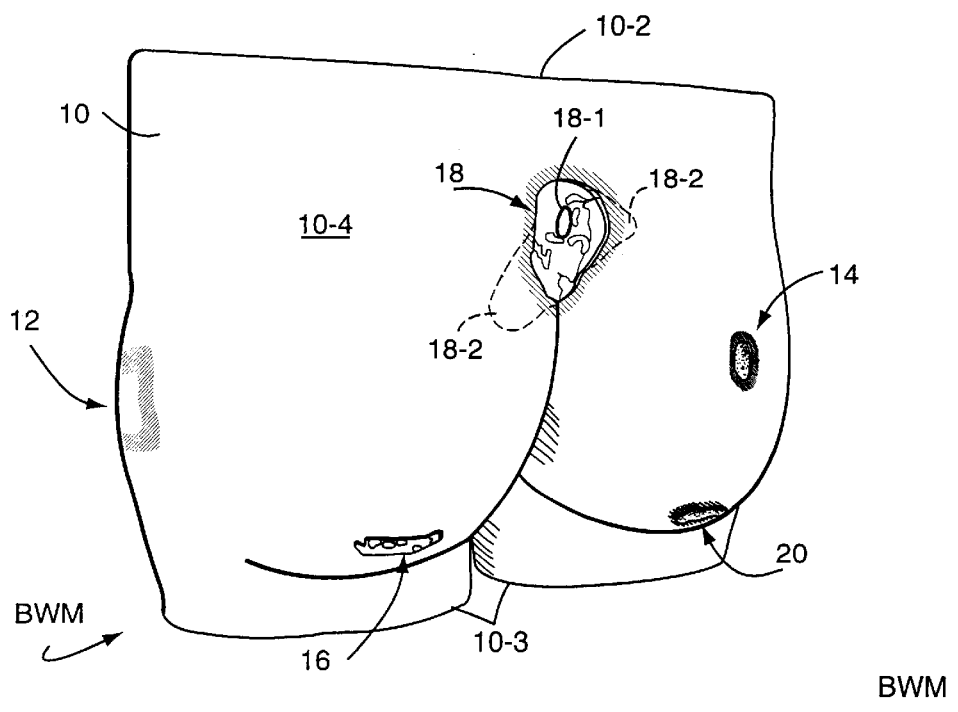

The present invention relates generally to medical and nursing training models and/or mannequins. More specifically, the present invention relates to training models and/or mannequins used to train medical personnel and patient care givers such as nurses, physical therapists, and the like, in the assessment and treatment of tissue wounds, particularly pressure ulcers.

BACKGROUND AND SUMMARY OF THE INVENTION

Pressure ulcers can be a common and costly problem in acute care, nursing home, and home care populations. A pressure ulcer is a lesion caused by unrelieved pressure resulting in damage to underlying tissue. Pressure ulcers usually occur over bony prominences and are graded or staged to classify the degree of tissue damage observed. Stage I pressure ulcers are those that present with nonblanchable erythema of intact skin. Stage II pressure ulcers include a partial thickness skin loss involving epidermis, dermis, or both. Stage III pressure ulcers are characterized by full thickness skin loss involving damage or necrosis of subcutaneous tissue that may extend down to, but not through, underlying fascia. Stage IV pressure ulcers present with full thickness skin loss with extensive destruction, tissue necrosis, or damage to muscle, bone or supporting structures.

Therefore, there is a need to train medical and nursing personnel and other patient care givers in the assessment and treatment of pressure ulcers. It is towards fulfilling such a need that the present invention is directed.

Broadly, the present invention is embodied in a three dimensional external human anatomy model which integrally includes pressure ulcer wound facsimiles representative of different pressure ulcer stages. More specifically, the wound model of the present invention is comprised of a three-dimensional sculpted base member resembling a portion of a human body which is provided integrally at discrete locations thereof with multiple pressure ulcer wound facsimiles, each of which respectively visually simulates a different type of Stage I–IV pressure ulcers. The base member may, however be provided with other (non-staged) pressure ulcer facsimiles, such as, for example, a pressure ulcer which is visually representative of granulation tissue, a trochanteric pressure ulcer covered with black eschar, or a yellowish coagulum as well as combinations of such pressure ulcer facsimiles.

It is especially preferred that the base member of the wound model in accordance with this invention be embodied in a three-dimensional sculpture representative of a human buttocks. However, the base member could, if desired, be embodied in other human body regions where pressure ulcers may occur, such as a person's hips, heels, back of head, shoulder and the like. Thus, although reference will hereinafter be made specifically to the base member being in the form of a three-dimension sculpture representative of a human buttocks, it will be appreciated that such reference is to a presently preferred embodiment of this invention.

Further aspects and advantages of the present invention will become more clear from the detailed description of the preferred exemplary embodiment thereof which follows.

BRIEF DESCRIPTION OF THE ACCOMPANYING DRAWINGS

Figure 2:
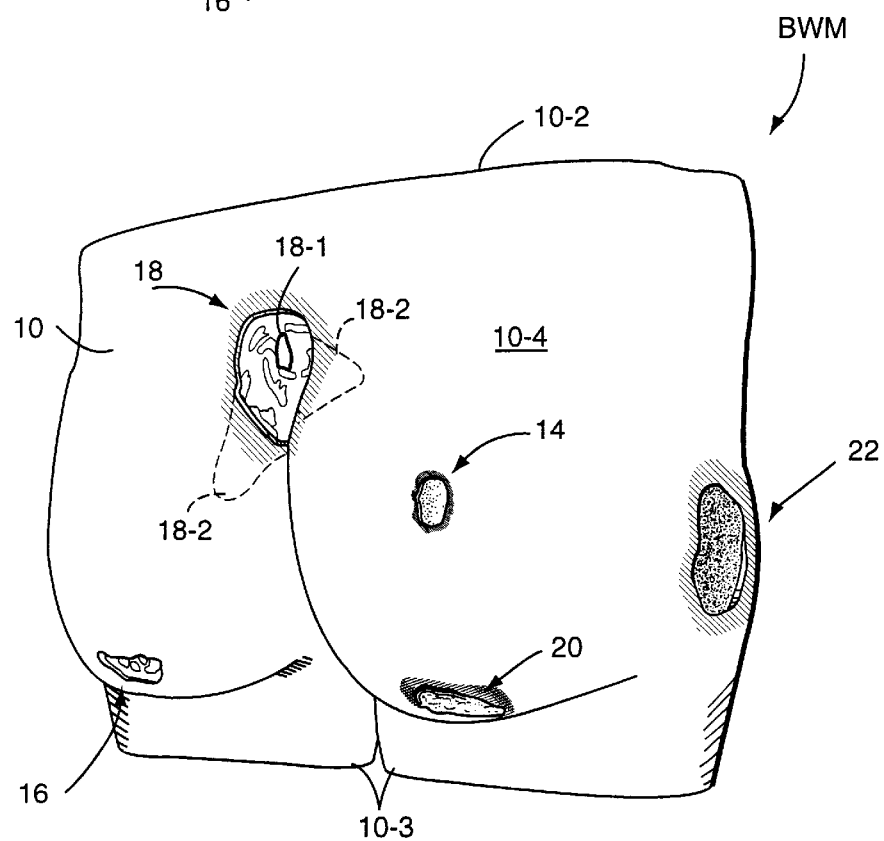
Figure 3:
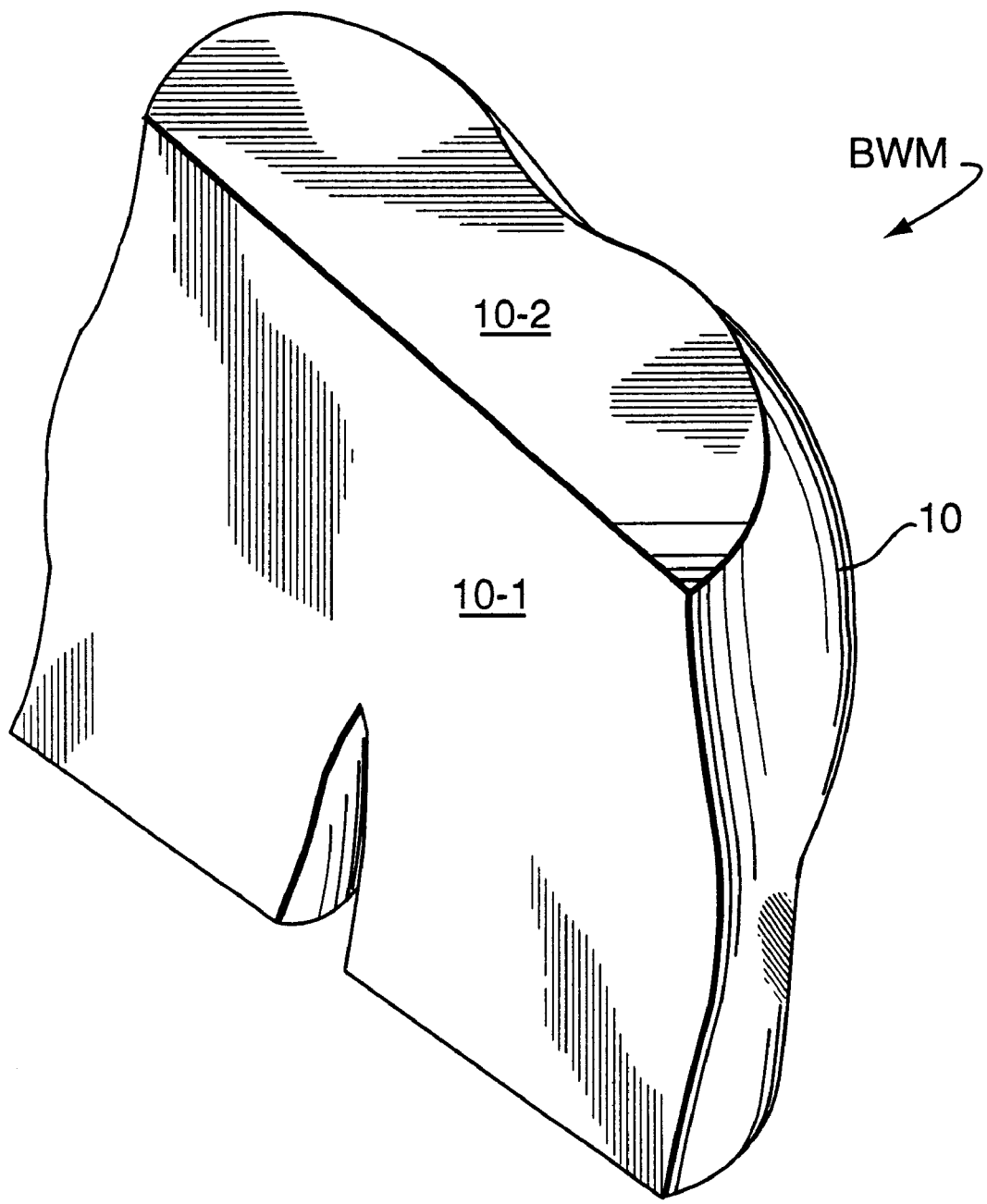

Reference will hereinafter be made to the accompanying drawings wherein like reference numerals throughout the various figures denote like structural elements, and wherein, FIG. 1 is a left side perspective view of a buttocks wound care model in accordance with the present invention;

FIG. 2 is the buttocks wound care model shown in FIG. 1, but depicted in a right side perspective view; and FIG. 3 is the buttocks wound care model shown in FIG. 1, but depicted in a bottom side perspective view.

DETAILED DESCRIPTION OF THE PREFERRED EXEMPLARY EMBODIMENT

As used herein, and in the accompanying claims, the various stages of pressure ulcers are those that have been advanced by the National Pressure Ulcer Advisory Panel Consensus Development Conference (NPUAP, 1989) as derived from previous staging systems proposed by the Wound Ostomy and Continence Nurses Society (WOCN) (International Association of Enterostomal Therapy, 1988). More specifically, as used herein and in the accompanying claims, the following definitions for the various stages of pressure ulcers shall be employed:

Stage I: Nonblanchable erythema of intact skin, the heralding lesion of skin ulceration. In individuals with darker skin, discoloration of the skin, warmth, edema, induration, or hardness may also be indicators.

Stage II: Partial Thickness skin loss involving epidermis, dermis, or both. The ulcer is superficial and presents clinically as an abrasion, blister or shallow crater.

Stage III: Full thickness skin loss involving damage to or necrosis of subcutaneous tissue that may extend down to, but not through, underlying fascia. The ulcer presents clinically as a deep crater with our without undermining of adjacent tissue.

Stage IV: Full thickness skin loss with extensive destruction, tissue necrosis, or damage to muscle, bone or supporting structures (e.g., tendon, joint capsule and the like). Undermining and sinus tracts also may be associated with Stage IV pressure ulcers.

A particularly preferred embodiment of the present invention is depicted in accompanying FIGS. 1–3 as a buttocks wound model BWM. Specifically, the buttocks wound model BWM is comprised of a three-dimensional sculpted base member 10 resembling a human buttocks formed from a suitable material (e.g., a plastics material) which mimics the buttocks' tissue density. Furthermore, in order to promote a more life-like representation, the base member may be provided with a complaint skin-like covering.

The base member 10 is provided with a planar rear surface 10-1 to allow the buttocks wound model BWM to be placed on a horizontal support surface. The upper and lower surfaces 10-2 and 10-3, are truncated at the waist and leg regions, respectively, so as to give the model a more life-like visual environment. The visible, upper surface 10-4 of the model BWM is thus in the form of a three-dimensional sculpture or relief simulating a human buttocks.

The base member 10 is provided integrally on surface 10-4 with multiple pressure ulcer facsimiles representative of a respective Stage I–IV pressure ulcer. In this regard, the pressure ulcer facsimile identified by reference numeral 12 is representative of a Stage I pressure ulcer since it is visually presented as a nonblanchable erythema of intact skin. The Stage II pressure ulcer facsimile on the base member 10 is identified by reference numeral 14. For purposes of the present invention, the Stage II pressure ulcer facsimile 14 is visually presented as an abrasion or shallow crater with accompanying partial thickness skin loss. The Stage III pressure ulcer facsimile is identified as reference numeral 16 and is presented visually as a deep crater and partial necrosis, recessed within the base member 10.

The Stage IV pressure ulcer facsimile is identified as reference numeral 18 and is visually presented as full thickness skin loss with extensive tissue damage in a deep recessed crater within the base member 10. In order to assist in assessing the staging of the Stage IV pressure ulcer facsimile 18, the site is also most preferably provided with a visible bone fragment 18-1 and/or with regions 18-2 representative of skin undermining. If present, the visible bone fragment representation 18-1 is most preferably formed of a relatively rigid material as compared to the more compliant material representative of the surrounding tissue.

In addition to depicting visually facsimiles of Stage I–IV pressure ulcers, the model BWM may also be provided with facsimiles of other (unstaged) pressure ulcers that may present to the medical personnel or care giver. For example, the base member 10 of model BWM may be provided integrally with a pressure wound facsimile 20 which is formed of a material and/or sculpted to visually represent a totally granulated pressure ulcer. In addition (or alternatively), the model BWM may be provided with a pressure ulcer facsimile 22 which visually represents a trochanteric pressure ulcer covered with black eschar. The location of the trochanteric pressure ulcer facsimile 22 would, of course, be positioned generally in the base member 10 laterally in the vicinity of the anatomical location of a person's great trochanter.

It is envisioned that the buttocks wound model BWM of this invention will be used predominantly to educate physicians, pharmacists, nurses, physical therapists as well as other personnel involved in the daily care of patients with pressure and other dermal ulcers. For example, the model may be used in conjunction with a presentation, didatic lecture, to the care givers in a classroom setting, or at virtually any meeting place, such as a hotel, an acute care facility, a long term care facility, a home health care agency or at the corporate offices of these types of facilities. The model may also advantageously be used in presentation to government officials, administrators as well as other payers of health care.

The model is envisioned to be used in conjunction with "ersatz medications", for example, substituting petroleum jelly for topical ointments, corn starch or similar powder, and the like for topical antibacterial powders, as well as the use of various dressings. These other dressings can be classified as alginates, hydrocolloids, films, foams, hydrogels, thin films and other "autolytic" dressing that are utilized in the management of pressure and other dermal ulcers.

The "hands-on" approach provided by means of the buttocks wound model BWM of this invention will be used by personnel so that attendees will become familiar with the use of various agents employed in managing pressure and other dermal ulcers as well as techniques in assessing and treating the same. Taping techniques, cleansing with liquids, such as normal saline, iodine solutions, and the like, may also be demonstrated and practiced by health care personnel attending these meetings using the buttocks wound model BWM of this invention. Gauze that has been impregnated with medications may also be discussed and used during such demonstrations and practice sessions.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A wound model comprised of a three-dimensional sculpted base member resembling an external region of a human body, said base member being provided integrally at discrete locations thereof with multiple pressure ulcer wound facsimiles each of which respectively visually simulates a different type of Stage I–IV pressure ulcers.

2. The wound model of claim 1, wherein the base member integrally includes a pressure ulcer wound facsimile having total granulation.

3. The wound model of claim 1, wherein the base member integrally includes a pressure ulcer wound facsimile covered with black eschar.

4. The wound model of any one of claims 1–3, wherein the base member integrally includes a trochanteric pressure ulcer facsimile.

5. The wound model of claim 1, wherein said base member includes a compliant skin-like covering, and wherein at least one of the pressure ulcer facsimiles is a facsimile of a Stage IV pressure ulcer exhibiting undermining under the skin-like covering.

6. The wound model of claim 1 or 5, wherein the base member integrally includes a Stage IV pressure ulcer facsimile exhibiting a visual bone fragment representation.

7. The wound model of claim 6, wherein the visible bone fragment representation is formed of a material which is harder as compared to the hardness of tissue representations surrounding the bone fragment representation.

8. The wound care model of claim 1, wherein the base member is a three-dimensional sculpture of human buttocks.

9. A buttocks pressure wound model comprised of a three-dimensional sculpted base member resembling a human buttocks, said base member being provided integrally at discrete locations thereof with multiple pressure ulcer wound facsimiles each of which respectively visually simulates a different type of Stage I–IV pressure ulcers.

10. The wound model of claim 9, wherein the base member integrally includes a pressure ulcer wound facsimile having total granulation.

11. The wound model of claim 9, wherein the base member integrally includes a pressure ulcer wound facsimile covered with black eschar.

12. The wound model of any one of claims 9–11, wherein the base member integrally includes a trochanteric pressure ulcer facsimile.

13. The wound model of claim 6, wherein said base member includes a compliant skin-like covering, and wherein at least one of the pressure ulcer facsimiles is a facsimile of a Stage IV pressure ulcer exhibiting undermining under the skin-like covering.

14. The wound model of claim 6 or 13, wherein the base member integrally includes a Stage IV pressure ulcer facsimile exhibiting a visual bone fragment representation.

15. The wound model of claim 14, wherein the visible bone fragment representation is formed of a material which is harder as compared to the hardness of tissue representations surrounding the bone fragment representation.

16. A pressure ulcer wound training method comprising using as a training aid a wound model having a three-dimensional sculpted base member resembling an external region of a human body, said base member being provided integrally at discrete locations thereof with multiple pressure ulcer wound facsimiles each of which respectively visually simulates a different type of Stage I–IV pressure ulcers.

17. The method of claim 16, comprising applying a topical dressing to a site of at least one of said pressure ulcer wound facsimiles.

18. The method of claim 17, wherein the topical dressing is at least one selected from ointments, powders and liquids.

19. The method of claim 17, wherein the topical dressing is a bandage covering the site of said at least one of said pressure ulcer wound facsimiles.

20. The method of claim 16, comprising measuring at least one of depth, size and staging of at least one of said pressure ulcer wound facsimiles.

21. The method of claim 16, which comprises using a wound model having a base member which integrally includes a pressure ulcer wound facsimile having total granulation.

22. The method of claim 16, which comprises using a wound model having a base member which integrally includes a pressure ulcer wound facsimile covered with black eschar.

23. The method of claim 16, which comprises using a wound model having a base member which resembles a human buttocks.

24. The method of claim 23, which comprises using a wound model having a base member which integrally includes a pressure ulcer wound facsimile having total granulation.

25. The method of claim 23, which comprises using a wound model having a base member which integrally includes a pressure ulcer wound facsimile covered with simulated black eschar.

26. A pressure ulcer wound training kit comprising:

(i) a wound model having a three-dimensional sculpted base member resembling an external region of a human body, said base member being provided integrally at discrete locations thereof with multiple pressure ulcer wound facsimiles each of which respectively visually simulates a different type of Stage I–IV pressure ulcers; and (ii) at least one demonstration topical dressing for at lest one of said pressure ulcer wound facsimiles.

27. The kit of claim 26, wherein the demonstration topical dressing is an ersatz topical medication.

28. The kit of claim 26, wherein the demonstration topical dressing is at least one selected from the group consisting of ointments, powders and liquids.

29. The kit of claim 26, wherein the demonstration topical dressing includes a bandage for covering a site of at least one of said pressure ulcer wound facsimiles.

30. The kit of claim 26, wherein the wound model has a base member which resembles a human buttocks.

31. The method of claim 30, wherein the wound model has a base member which integrally includes a pressure ulcer wound facsimile having total granulation.

32. The method of claim 30, wherein the wound model has a base member which integrally includes a pressure ulcer wound facsimile covered with simulated black eschar.

* * * * *